Nov. 20, 1945.  A. A. McCORMACK  2,389,446
ELECTRICAL APPLIANCE
Filed March 27, 1942  2 Sheets-Sheet 1

Alex A. McCormack, INVENTOR.
BY Spencer, Hardman & Fehr,
Attorneys.

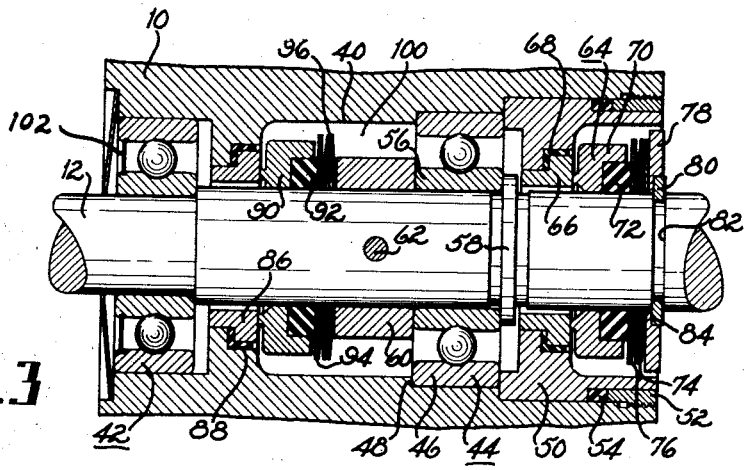
Fig. 3
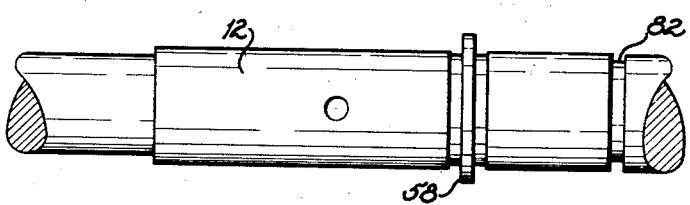
Fig. 4
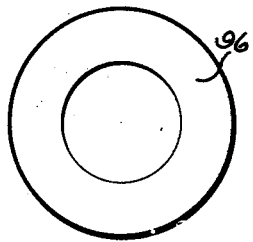 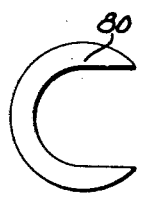 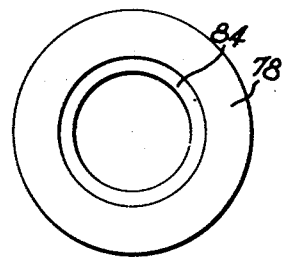
Fig. 5   Fig. 6   Fig. 7   Fig. 8

Patented Nov. 20, 1945

2,389,446

UNITED STATES PATENT OFFICE 2,389,446

ELECTRICAL APPLIANCE

Alex A. McCormack, Dayton, Ohio, assignor to General Motors Corporation, Dayton, Ohio, a corporation of Delaware Application March 27, 1942, Serial No. 436,422

6 Claims. (Cl. 200—19)

This invention relates to an electrical appliance and more particularly to a distributor for use in airplanes and the like.

One object of this invention is to provide a distributor suitable for use in high altitude flying.

One of the problems in the design of a distributor for use in high altitude flying is that of preventing sparking. It is an object of this invention to provide an improved distributor wherein the contacts are sealed within a chamber filled with an inert gas such as nitrogen.

Another object is to provide means for preventing condensation within the distributor.

It is a further object of this invention to provide means for indicating the loss of inert gas from the contact chamber.

Still another object of this invention is to provide an improved arrangement for sealing the contact chamber.

Further objects and advantages of the present invention will be apparent from the following description, reference being had to the accompanying drawings, wherein a preferred form of the present invention is clearly shown.

In the drawings:

Fig. 3 is a fragmentary sectional view showing the shaft seal structure.

Fig. 4 is a fragmentary elevational view showing the shaft.

Fig. 5 is a plan view of one of the shaft seal spring washers.

Fig. 6 is a view of the same washer taken at right angles to Fig. 5.

Fig. 7 is a plan view of a washer.

Fig. 8 is a plan view of a washer used for locking in place the washer shown in Fig. 7.

Figure 1:
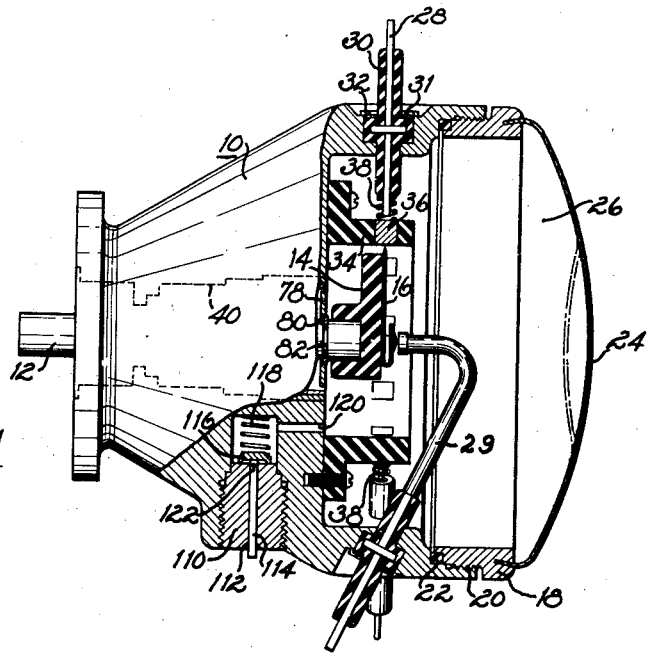
Fig. 1 is an elevational view partly in section of a distributor embodying my invention.
Figure 2:
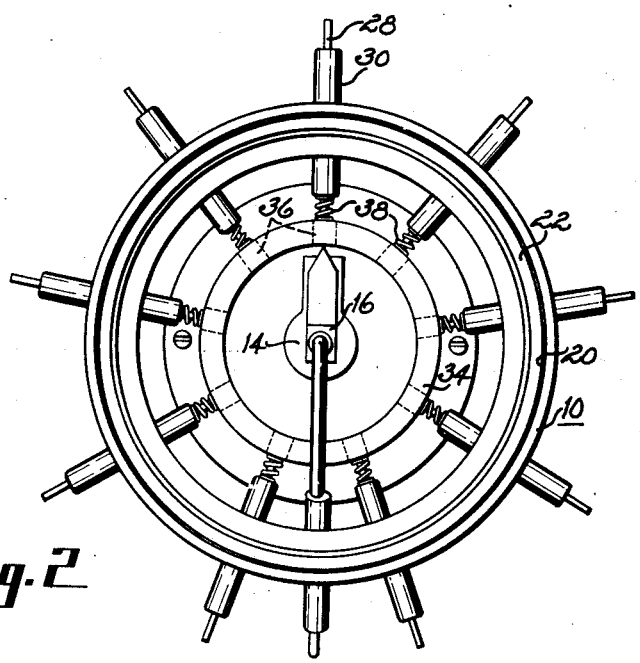
Fig. 2 is a plan view of the distributor with the cap removed so as to show the arrangement of the contacts.

The distributor comprises a main frame 10 in which the main drive shaft 12 is journaled. The shaft 12 is adapted to be driven from an engine (not shown) in accordance with well known practice. The distributor contact 16 is mounted on the end of the shaft 12 so as to rotate therewith. A cap member 18 is secured to the main frame 10 preferably by means of a threaded connection such as the connection 20. A gasket 22 is provided between the cap 18 and the frame 10 so as to provide a gas tight joint between the cap 18 and the frame 10. Reference numeral 24 designates a thin flexible wall which forms one portion of the cap 18. It has been found desirable to charge the contact chamber 26 with a dry inert gas such as nitrogen and to maintain the inert gas within the chamber above atmospheric pressure so as to prevent air from leaking into the chamber, and so as to more effectively prevent destructive arcing. The flexible wall 24 is designed so that when the pressure of the inert gas is adequate, the wall assumes the full line position shown in Fig. 1 but assumes the dotted line position if an appreciable amount of the inert gas has escaped from the contact chamber. By virtue of this arrangement, it is possible to determine whether or not any appreciable amount of inert gas has escaped from the distributor merely by looking at the shape of the flexible wall 24.

Stationary lead-ins 28 are provided in the manner shown. The number of lead-ins required is determined by the number of cylinders to which spark impulses are to be distributed. A special lead-in 29 is provided for supplying electricity to the main distributor contact 16. A rubber-like insert 30 is provided for each stationary lead-in. This insert is preferably formed of a synthetic rubber such as "neoprene" or "Hycar" and is preferably vulcanized to the lead-in prior to assembly. After the lead-in together with the rubber-like insert and a washer 31 have been mounted in place, the metal adjacent the washer is spun over the washer, as shown at 32 in the drawings, so as to wedge the rubber insert in place whereby a gas tight joint is formed between the contact and the casing. In order to compensate for distortion of the insert, I have provided a separate contact mounting element 34 made of some suitable insulating material such as "Bakelite" or the like which is secured to the main frame 10 and carries the contacts 36 which are accurately spaced with respect to the main distributing contact 16. Each of the contacts 36 is electrically connected to one of the terminals 28 by means of a spring element 38 arranged as shown in the drawings. By virtue of this arrangement, any inaccuracy in the mounting of the lead-in contacts does not interfere with the position of the main contacts.

In order to prevent the escape of inert gas between the shaft 12 and the casing 10, a specially designed shaft seal means has been provided. As shown in Figs. 1 and 3, a main casing 10 is provided with an irregular bore 40 in which the shaft seal mechanism and the shaft bearings are mounted. As shown in Fig. 3, two sets of ball bearing assemblies 42 and 44 have been provided for supporting the main shaft 12 within the main frame 10. The outer race 46 of the ball bearing assembly 44 is held in place between the shoulder 48 provided by the bore 40 and the retaining member 50. The retaining member 50 is held in place by the nut 52. A gasket 54 is provided between the nut 52 and the retaining member 50 so as to provide a gas tight joint between the retaining member 50 and the main frame 10. The inner race 56 of the ball bearing unit 44 is fixed onto the shaft 12 between the flange 58 which is formed integral with the main shaft 12 and the collar 60 which is held in place on the shaft 12 by means of the pin 62. By virtue of this construction, the shaft is prevented from moving longitudinally within the bore 40. The ball bearing assembly 42 may be held in place in any suitable manner such as by shrinking. It will be noted that the ball bearing assembly 42 is mounted in a cavity immediately adjacent the end wall of the main distributor housing 10 whereby it serves to rigidly support the driving end of the shaft 12.

In order to prevent the escape of inert gas from the contact chamber 26 into the lubricant chamber 100, a first shaft seal generally designated by the reference character 64 is provided. This shaft seal comprises a relatively stationary sealing ring 66 which is resiliently supported by the retaining member 50 by means of the resilient insert 68. The member 68 also serves to seal the joint between the ring 66 and the retaining member 50. A rotatable sealing ring 70 is arranged in sealing engagement with the ring 66 and is supported on the shaft 12 so as to rotate with the shaft. A gasket 72 is provided for sealing the joint between the ring 70 and the shaft 12. The rotatable sealing ring 70 is biased into sealing engagement with the stationary ring 66 by means of a pair of oppositely disposed resilient washers 74 which are bowed as shown in Figs. 3 and 6. The washers 74 are disposed between a flat washer 76 arranged in contact with the gasket 72 and a washer 78 carried by the shaft 12.

The washer 78 is held in place on the shaft 12 by the element 80 which extends into the groove 82 provided on the shaft 12. The washer 80, as shown in Fig. 7, somewhat resembles a horse shoe in that the one side is cut away so as to enable the washer to be slipped into the groove 82. After the washer 80 has been slipped into the groove 82, it is held in place by the washer 78 which is recessed at 84 so as to accommodate the washer 80. By virtue of the fact that the ring 66 is resiliently supported, and by virtue of the fact that the shaft 12 is prevented from moving longitudinally any appreciable extent, substantially flat washers may be used for biasing the sealing rings in engagement whereas otherwise relatively large coil springs would be required.

A somewhat similar shaft seal is provided between the ball bearing assembly 42 and the ball bearing assembly 44. This latter shaft seal comprises a stationary sealing ring 86 resiliently supported by the gasket 88 carried directly by the main frame 10 and a rotatable sealing ring 90 carried by the shaft 12. A gasket 92 similar in construction and operation to the gasket 72 is provided for sealing the joint between the ring 90 and the shaft 12. A washer 94 is provided adjacent the one face of the resilient gasket 92. A pair of bowed spring washers 96 is provided between the washer 94 and the collar 60 for biasing the sealing rings 90 and 96 into sealing engagement with one another. The washers 74 and 96 are sufficiently strong so as to compress the resilient gaskets 72 and 92 respectively so as to provide gas tight joints adjacent the shaft 12.

The cavity 100 formed between the two shaft seals is partially filled with a suitable lubricant which lubricates the ball bearing assembly 44 and the shaft seals. The amount of lubricant provided is sufficient to last for the normal life of the distributor. The ball bearing assembly 42 is packed in a lifetime supply of grease or lubricant in accordance with well known practice. Lubricant retaining means 102 has been provided for preventing the escape of lubricant or grease from the end of the ball bearing assembly 42.

At high altitudes, the lubricant in the chamber 100 is subjected to a pressure higher than the prevailing atmospheric pressure but lower than the pressure of the inert gas within the contact chamber. By virtue of this arrangement, the total pressure drop is divided between the two seals so that neither seal is required to withstand the full pressure drop. Furthermore, with this arrangement, it is apparent that the high pressure inert gas helps to bias the sealing ring 70 into sealing engagement with the sealing ring 66 and the pressure within the lubricant chamber 100 helps to bias the sealing ring 90 into sealing engagement with the sealing ring 86.

As shown in Fig. 1, a charging plug 110 has been provided in one wall of the main frame 10. This plug is provided with a central passage 112 through which a gas charging plunger 114 may be inserted. The inner end of the gas feeding passage 112 is normally sealed by means of the valve element 116. A spring 118 biases the valve 116 into sealing engagement with the plug 110. A passage 120 is provided between the main contact chamber 26 and the valve 116. The gas charging plunger 114 is in the form of a hollow pipe which is adapted to be connected to a supply of high pressure gas and which is provided with an aperture 122 at its inner end. By pushing the plunger 114 inwardly through the bore 112, the valve plate 116 is displaced so as to allow gas under pressure to be supplied to the gas chamber.

All of the gaskets shown and described herein may be made from any one of several well known rubber substitutes which are not injured by lubricant. The sealing rings 66, 70, 86 and 90 are preferably made from some wear resisting metal alloy such as Nitralloy. For purposes of illustration, I have shown a metallic casing whereas it is apparent that many of the features of my invention are equally applicable to distributors having non-metallic casings.

While the form of embodiment of the invention as herein disclosed constitutes a preferred form, it is to be understood that other forms might be adopted, all coming within the scope of the claims which follow.

What is claimed is as follows:

1. A distributor for use in high altitude flying comprising in combination, a casing, a first chamber in said casing adapted to contain inert gas under pressure, a second chamber within said casing, a shaft projecting through one wall of said casing and extending through said second chamber and into the first chamber, bearing means for said shaft comprising a first bearing and a second bearing, one of which is disposed within said second chamber, shaft seal means preventing the escape of inert gas from said first named chamber and said second named chamber, shaft seal means for preventing the escape of fluid from said second named chamber to the outside atmosphere, a plurality of contacts projecting into said first named chamber, a distributor contact mounted on said shaft within said first named chamber for distributing spark impulses to said contacts, said first named chamber including a flexible wall portion, said second named chamber adapted to contain a supply of lubricant maintained at a pressure above atmospheric pressure but below the pressure of said inert gas.

2. A distributor comprising in combination, a main frame, means cooperating with said frame forming a high pressure gas chamber, circuit making and breaking means disposed within said chamber, a bearing aperture in said frame, a shaft journaled within said aperture, a pair of shaft seal means disposed within said aperture, said shaft seal means being spaced from one another on said shaft so as to provide a lubricant reservoir therebetween, means for subjecting the lubricant within said reservoir to a pressure higher than atmospheric but lower than the pressure within said gas chamber, one of said shaft seal means having its pressure side disposed toward said gas chamber and the other of said shaft seal means having its pressure side disposed toward said lubricant supply reservoir.

3. In combination, a main frame, means cooperating with said frame forming a high pressure gas chamber, a bearing aperture in said frame, a shaft journaled within said aperture, a pair of shaft seal means disposed within said aperture, said shaft seal means being spaced from one another on said shaft so as to provide a lubricant reservoir therebetween, said lubricant within said reservoir being subjected to a pressure equal to or higher than normal atmospheric pressure but lower than the pressure within said gas chamber, one of said shaft seal means having its pressure side disposed toward said gas chamber and the other of said shaft seal means having its pressure side disposed toward said lubricant supply reservoir.

4. In a distributor for use in high altitude flying, a casing having a contact chamber containing an inert gas under pressure and having a shaft seal chamber containing a supply of lubricant, distributor contacts mounted in said contact chamber, a shaft rotatably supported in one wall of said casing for imparting rotation to one of said contacts, shaft seal means within said shaft seal chamber for preventing the flow of fluid along said shaft, a bearing for said shaft disposed within said shaft seal chamber, said shaft seal means comprising a first shaft seal having its pressure side disposed towards the inert gas within said contact chamber and a second shaft seal having its pressure side disposed towards the lubricant within said shaft seal chamber.

5. In combination, a casing having a contact chamber adapted to contain a supply of inert gas under pressure, one wall of said casing comprising a flexible portion adapted to be bowed outwardly in response to a predetermined pressure differential between the inside of said chamber and the outside atmosphere, electrical leads projecting through the wall of said casing, resilient bushings supporting said leads, a shaft journaled in one wall of said casing, a contact carrying ring disposed within said casing in fixed relationship to said shaft, contacts carried by said contact ring, electrical connections from said leads to said contacts, a pair of spaced shaft seal means preventing the escape of gas from said chamber along said shaft, bearing means for said shaft disposed between said shaft seals, the space between said shaft seals forming a lubricant sump containing a body of lubricant for said bearing means, and means for imparting rotation to said shaft, said body of lubricant being adapted to be maintained at a pressure below the pressure of the gas within said contact chamber and above atmospheric pressure whereby the pressure difference between opposite sides of each shaft seal is less than the pressure difference between said contact chamber and the atmosphere.

6. In combination, a casing having a contact chamber adapted to contain a supply of inert gas under pressure, electrical leads projecting through the wall of said casing, resilient bushings supporting said leads, a shaft journaled in one wall of said casing, a contact carrying ring disposed within said casing in fixed relationship to said shaft contacts carried by said contact ring, electrical connections from said leads to said contacts, a pair of spaced shaft seal means preventing the escape of gas from said chamber along said shaft, bearing means for said shaft disposed between said shaft seals, the space between said shaft seals forming a lubricant sump containing a body of lubricant for said bearing means, and means for imparting rotation to said shaft, said body of lubricant being adapted to be maintained at a pressure below the pressure of the gas within said contact chamber and above atmospheric pressure whereby the pressure difference between opposite sides of each shaft seal is less than the pressure difference between said contact chamber and the atmosphere.

ALEX A. McCORMACK.